April 19, 1932.    R. C. WILLIAMSON    1,855,078
APPARATUS FOR CUTTING FLAT GLASS
Filed Aug. 8, 1931
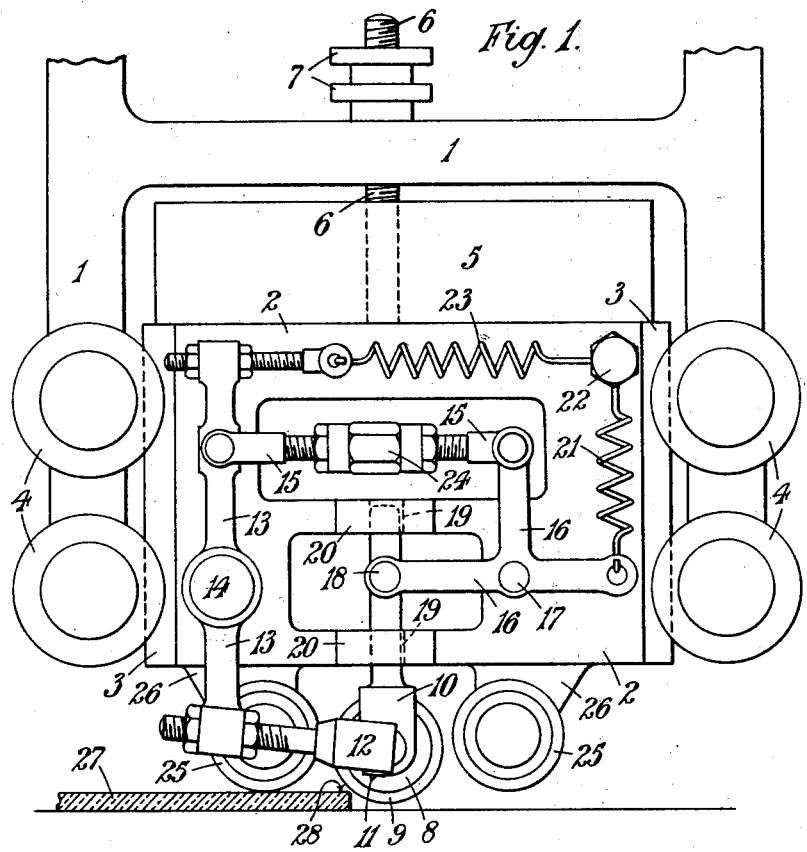
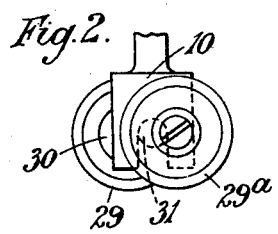
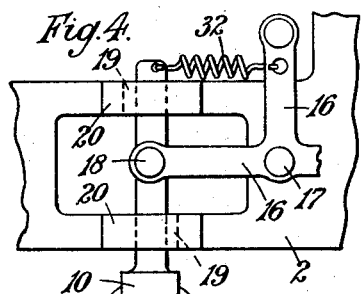
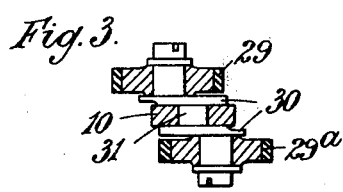
Inventor.
R. C. Williamson
By Morrison, Kennedy & Campbell
Attys.

Patented Apr. 19, 1932

1,855,078

UNITED STATES PATENT OFFICE

ROBERT CHARLES WILLIAMSON, OF DONCASTER, ENGLAND, ASSIGNOR TO PILKINGTON BROTHERS LIMITED, OF LIVERPOOL, ENGLAND, A LIMITED LIABILITY COMPANY

APPARATUS FOR CUTTING FLAT GLASS

Application filed August 8, 1931, Serial No. 556,018, and in Great Britain August 11, 1930.

This invention relates to apparatus for cutting flat glass and has for its object an improved device for applying the diamond or wheel to the glass.

In the following specification and claims it is assumed that a diamond is used as a cutter and that the glass is caused to travel beneath the diamond, but it is to be understood that the specification and claims are deemed to include the equivalent apparatus in which a wheel is used as cutter and in which the diamond or wheel is caused to travel over stationary glass.

According to the invention a diamond holder and a feeler are so mounted on a frame that the upward movement of the feeler, when it is raised by the forward edge of the glass, causes a downward movement of the diamond holder to bring the diamond into contact with the glass at a point back of the front edge, whereby the diamond is protected against injury by being struck by the forward edge of the glass.

Further, the diamond may also be caused to rise from the glass before reaching the back end of the glass, either by a feeler having two points of contact with the glass, one in advance of the other, or by a feeler adapted to yield forwardly when struck by the forward edge of the glass, or by the use of yielding material, such as soft rubber, at the point of contact between the forward edge of the glass and the feeler.

The frame carrying the diamond holder and feeler is provided with wheels or the like adapted to rest on the glass, and is capable of up and down movement and is downwardly pressed. By these means the relative position of feeler and diamond is independent of the thickness of the glass.

In the accompanying drawings:—

Figure 1 is a front view of the device;

Figure 2 is a front view of an alternative form of feeler;

Figure 3 is a horizontal central section of Figure 2, and

Figure 4 is a front view of an alternative form of feeler mounting.

Referring to Figure 1, 1 is a framework carrying the device. A frame 2 is adapted to slide vertically in the framework 1 by means of V's 3 engaging V grooves in wheels 4 pivoted on the framework 1. The frame 2 is downwardly pressed by a weight 5, and its downward movement is limited by means of a rod 6 attached to the frame, and adjusting nuts 7 bearing on the framework 1.

The feeler consists of a wheel 8 with rubber covering or tire 9, pivoted in a member 10. The diamond 11 is mounted in a holder 12 which is linked to the member 10 by a lever 13 pivoted to the frame 2 at 14, link 15 and lever 16, pivoted to the frame at 17 and to the member 10 at 18. The member 10 is adapted to slide in slots 19 in projections 20 of the frame 2, having sufficient play in the slots 19 to take care of the arcuate movement of the pivot 18.

A spring 21 between the lever 16 and a screw 22 in the frame 2, tends to keep the feeler in its low, and the diamond in its high, position. A spring 23 between the screw 22 and the lever 13 opposes, but is less stiff than, the spring 21 and serves to take up backlash in the pivots of the linkage. The link 15 has a length-adjusting nut or turnbuckle 24, and the holder 12 is adjustable in the lever 13 whereby the relative positions of feeler wheel 8 and diamond 11 may be adjusted.

Wheels 25 are pivoted on projections 26 of the frame 2.

A sheet of glass 27 is travelling from left to right, and, in the position shown, has passed under the left hand wheel 25, thereby raising the frame 2. The forward edge of the glass 27 has just come into contact with the feeler wheel 8 and continued travel of the glass will raise the wheel 8 thereby bringing the diamond 11 into contact with the glass at a point 28 slightly back of the forward edge of the glass.

The depth of cut made by the diamond is determined by the length-adjusting nut 24.

Since the position of the frame 2 is determined by the upper surface of the glass on which the wheels 25 rest, the relative position of the feeler wheel 8 and the diamond 11 when in operative position is independent of the thickness of the glass.

In the alternative form of feeler shown in

Figures 2 and 3, two rubber tired wheels 29, 29ª are pivoted on a double-crank piece 30 which is pivoted at 31 in the member 10. When the forward edge of the glass 27 raises the left-hand wheel 29, the piece 30 can turn in the member 10, so that the member is not lifted until the glass, in its continued movement, also raises the right-hand wheel 29ª. The diamond therefore is not brought into contact with the glass until the right-hand wheel 29ª is raised; it is, however, brought out of contact with the glass as soon as the left-hand wheel 29 falls off the back edge of the glass. By suitably adjusting, horizontally, the position of the diamond relatively to the two wheels 29, 29ª, the diamond can be brought into contact with the glass at a point back of the front edge and brought out of contact with the glass at a point in front of the back edge.

Figure 4 (in which the same reference figures indicate parts similar to those bearing the same references in Figure 1) shows an alternative device for attaining the same object as that attained by the device shown in Figures 2 and 3. The feeler member 10 slides, as in Figure 1, in slots in the projections 20, but the slots are lengthened as at 19, 19, while a spring 32 normally retains the member 10, as shown, against one side of each slot. When the forward edge of the glass presses the feeler wheel 8 to the right, it first turns the member 10 counter-clockwise on its pivot 18 until it reaches the other sides of the slots 19, and only then raises the feeler wheel to bring the diamond into contact with the glass. The forward edge of the glass would then be in the position shown in dotted lines, before it began to raise the feeler wheel 8, and the diamond will then be at the point 33 in order to come into contact with the glass at the point 28, which, at the time of contact, will be in advance of the centre line of the feeler wheel 8. As soon as the feeler wheel 8 has been raised and runs on the surface of the glass, the member 10 will be brought back into its normal position, in which it is shown in Figure 4, by the spring 32, and, when the back edge of the glass passes the centre line of the feeler wheel 8, the wheel, by falling, will raise the diamond as it reaches the back edge.

Instead of mounting the feeler member 10 so as to yield as in the arrangement of Figure 4, the necessary yielding may take place at the surface of the feeler wheel itself, by forming its covering 9 of rubber soft enough to be appreciably indented by the edges of the glass. In consequence of this yielding, the feeler wheel will raise a little later and will fall a little sooner than if the wheel were of hard substance.

If then, in the arrangement of Figure 1, the diamond be so adjusted that it would make contact with the upper angle of the front edge of the glass if the wheel covering 9 were hard, it will, if the covering 9 be soft, make contact with the glass back of the front edge and rise off the glass before the back edge.

Having described my invention, I declare that what I claim and desire to secure by Letters Patent is:—

1. Cutter holder device for cutting travelling flat glass comprising a frame adapted to be raised by and rest on the glass, a cutter pivoted to the frame, a feeler pivoted to the frame and adapted to be raised relatively to the frame by the glass and a connection between the feeler and the cutter adapted to bring the cutter into contact with the glass when the feeler is raised.

2. Cutter holder device for cutting travelling flat glass comprising a frame adapted to be raised by and rest on the glass, a cutter pivoted to the frame, a feeler pivoted to the frame and adapted to be raised relatively to the frame by the glass and a connection between the feeler and the cutter adapted to bring the cutter into contact with the glass behind its front edge when the feeler is raised and out of contact with the glass before its back edge when the feeler falls.

3. Cutter holder device for cutting travelling flat glass comprising a frame adapted to be raised by and rest on the glass, a cutter pivoted to the frame, a feeler pivoted to the frame and adapted to be moved forward by the front edge of the glass and then to be raised relatively to the frame by the glass and a connection between the feeler and the cutter adapted to bring the cutter into contact with the glass when the feeler is raised.

4. Cutter holder device for cutting travelling flat glass comprising a frame adapted to be raised by and rest on the glass, a cutter pivoted to the frame, a feeler pivoted to the frame and adapted to be raised relatively to the frame by the glass, a covering on the feeler so soft that the glass appreciably beds itself therein before raising the feeler and a connection between the feeler and the cutter adapted to bring the cutter into contact with the glass behind its front edge when the feeler is raised and out of contact with the glass before its back edge when the feeler falls.

In witness whereof I have affixed my signature hereto.

ROBERT CHARLES WILLIAMSON.